US009898937B2

(12) United States Patent
Poulsen et al.

(10) Patent No.: US 9,898,937 B2
(45) Date of Patent: Feb. 20, 2018

(54) SURGICAL TRAINING MODEL FOR LAPAROSCOPIC PROCEDURES

(71) Applicant: Applied Medical Resources Corporation, Rancho Santa Margarita, CA (US)

(72) Inventors: Nikolai Poulsen, Rancho Santa Margarita, CA (US); Amy Garces, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 249 days.

(21) Appl. No.: 14/040,212

(22) Filed: Sep. 27, 2013

(65) Prior Publication Data

US 2014/0093852 A1    Apr. 3, 2014

Related U.S. Application Data

(60) Provisional application No. 61/707,658, filed on Sep. 28, 2012.

(51) Int. Cl.
G09B 23/28    (2006.01)

(52) U.S. Cl.
CPC .................. *G09B 23/285* (2013.01)

(58) Field of Classification Search
CPC .................................................... G09B 23/285
See application file for complete search history.

(56) References Cited

U.S. PATENT DOCUMENTS

| 184,573 A | 11/1876 | Becker |
| 2,127,774 A | 8/1938 | Jacobson |

(Continued)

FOREIGN PATENT DOCUMENTS

| CN | 2421706 Y | 2/2001 |
| CN | 2751372 Y | 1/2006 |

(Continued)

OTHER PUBLICATIONS

European Patent Office, International Search Report for International Application No. PCT/US2011/053859 A3, dated May 4, 2012, entitled "Portable Laparoscopic Trainer".

(Continued)

*Primary Examiner* — Sam Yao
*Assistant Examiner* — Evan Page
(74) *Attorney, Agent, or Firm* — Rimas T. Lukas (57) ABSTRACT

A model for practicing laparoscopic surgical skills is provided. The model includes a base having a plurality of practice stations at the upper surface. The practice stations include a cover having a first closed position in which a cavity is concealed beneath the cover and a second open position in which the cover is moved to uncover the cavity. The covers are connected to the surface in a number of ways to provide a variety of haptic responses useful in fine-tuning laparoscopic surgical skills. The cover is configured as a door hinged with or without a bias, a flexible flap, a sliding cover, a lid, and a penetrable sheet. An object for removal is hidden inside the cavity underneath the cover for practicing hand-to-hand transfer of instruments, use of both hands, switching instruments and determining and visualizing tissue planes in a laparoscopic environment.

15 Claims, 2 Drawing Sheets

(56) References Cited

U.S. PATENT DOCUMENTS

| | | |
|---|---|---|
| 2,284,888 A | 6/1942 | Arnell, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A * | 9/1999 | Hasson ............ G09B 23/286 434/262 |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,021,162 B2 | 9/2011 | Sui |
| 8,048,088 B2 | 11/2011 | Green et al. |

(56) References Cited

U.S. PATENT DOCUMENTS

| | | |
|---|---|---|
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Hendrickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,336,694 B2 | 5/2016 | Shim et al. |
| 9,351,714 B2 | 5/2016 | Ross et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1* | 5/2003 | Chosack ............... G09B 23/285 434/262 |
| 2003/0176770 A1 | 9/2003 | Merril et al. |
| 2004/0005423 A1 | 1/2004 | Dalton et al. |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1* | 7/2007 | Yarin .................. G09B 23/285 434/267 |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0258611 A1 | 10/2010 | Smith et al. |
| 2010/0273136 A1 | 10/2010 | Kandasami et al. |
| 2010/0279263 A1 | 11/2010 | Duryea |

(56) References Cited

U.S. PATENT DOCUMENTS

| | | |
|---|---|---|
| 2010/0324541 A1 | 12/2010 | Whitman |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Okano et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Million et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlok |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0133158 A1 | 5/2016 | Sui et al. |
| 2016/0140876 A1 | 5/2016 | Jabbour et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |

(56) References Cited

U.S. PATENT DOCUMENTS

| | | | |
|---|---|---|---|
| 2016/0262745 A1 | 9/2016 | Morgan et al. | |
| 2016/0293055 A1 | 10/2016 | Hofstetter | |
| 2016/0296144 A1 | 10/2016 | Gaddam et al. | |

FOREIGN PATENT DOCUMENTS

| | | | |
|---|---|---|---|
| CN | 2909427 Y | 6/2007 | |
| CN | 101313842 A | 12/2008 | |
| CN | 201364679 Y | 12/2009 | |
| CN | 201955979 U | 8/2011 | |
| CN | 202443680 U | 9/2012 | |
| CN | 202563792 U | 11/2012 | |
| CN | 202601055 U | 12/2012 | |
| CN | 202694651 U | 1/2013 | |
| CN | 103050040 A | 4/2013 | |
| CN | 203013103 U | 6/2013 | |
| CN | 203038549 U | 7/2013 | |
| CN | 203338651 U | 12/2013 | |
| CN | 203397593 U | 1/2014 | |
| CN | 203562128 U | 4/2014 | |
| CN | 10388679 A | 6/2014 | |
| DE | 41 05 892 | 8/1992 | |
| DE | 44 14 832 | 11/1995 | |
| DE | 19716341 C2 | 9/2000 | |
| EP | 1 024 173 A1 | 8/2000 | |
| FR | 2 691 826 | 12/1993 | |
| FR | 2 917 876 | 12/2008 | |
| FR | 2 917 876 A1 | 12/2008 | |
| GB | 2488994 A | 9/2012 | |
| JP | 10 211160 | 8/1998 | |
| JP | 2001005378 A | 1/2001 | |
| JP | 2009236963 A | 10/2009 | |
| JP | 3162161 U | 8/2010 | |
| JP | 2013127496 A | 6/2013 | |
| MX | PA 02004422 A | 11/2003 | |
| PT | 106230 | 9/2013 | |
| WO | WO 94/06109 | 3/1994 | |
| WO | WO 96/042076 | 2/1996 | |
| WO | WO 98/58358 | 12/1998 | |
| WO | WO 99/01074 A1 | 1/1999 | |
| WO | WO 00/36577 | 6/2000 | |
| WO | WO 02/38039 A2 | 5/2002 | |
| WO | WO 02/38039 A3 | 5/2002 | |
| WO | WO 2004/032095 | 4/2004 | |
| WO | WO 2004/082486 A1 | 9/2004 | |
| WO | WO 2005/071639 A1 | 8/2005 | |
| WO | WO 2006/083963 A2 | 8/2006 | |
| WO | WO 2007/068360 | 6/2007 | |
| WO | WO 2008/021720 A2 | 2/2008 | |
| WO | WO 2009/000939 | 12/2008 | |
| WO | 2010/094730 | 8/2010 | |
| WO | WO 2010/094730 | 8/2010 | |
| WO | WO 2011/035410 A1 | 3/2011 | |
| WO | WO 2011/046606 A1 | 4/2011 | |
| WO | WO 2011/151304 A1 | 12/2011 | |
| WO | WO 2012/149606 A1 | 11/2012 | |
| WO | WO 2012168287 A1 | 12/2012 | |
| WO | WO 2012175993 | 12/2012 | |
| WO | WO 2013/048978 A1 | 4/2013 | |
| WO | WO 2013/103956 A1 | 7/2013 | |
| WO | WO 2014/022815 A1 | 2/2014 | |
| WO | WO 2014/093669 A1 | 6/2014 | |
| WO | WO 2015/148817 A1 | 10/2015 | |

OTHER PUBLICATIONS

European Patent Office, The International Search Report and Written Opinion for International Application No. PCT/US2012/60997, dated Mar. 7, 2013, entitled "Simulated Tissue Structure for Surgical Training".
European Patent Office, The International Search Report and Written Opinion for International Application No. PCT/US2012/070971, dated Mar. 18, 2013, entitled "Advanced Surgical Simulation".
Human Patient Simulator, Medical Education Technologies, Inc., http://www.meti.com (1999) all.
The International Bureau of WIPO, International Preliminary Report on Patentability for International Application No. PCT/US2011/053859, titled "Portable Laparoscopic Trainer" dated Apr. 2, 2013.
European Patent Office, The International Search Report and Written Opinion for International Application No. PCT/US2013/062363, dated Jan. 22, 2014, entitled "Surgical Training Model for Laparoscopic Procedures".
European Patent Office, The International Search Report and Written Opinion for International Application No. PCT/US2013/061949, dated Feb. 17, 2014, entitled "Surgical Training Model for Laparoscopic Procedures".
Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, dated Feb. 17, 2014, entitled "Surgical Training Model for Transluminal Procedures".
European Patent Office, The International Search Report and Written Opinion for International Application No. PCT/US2013/061557, dated Feb. 10, 2014, entitled "Surgical Training Model for Laparoscopic Procedures".
European Patent Office, The International Search Report and Written Opinion for International Application No. PCT/US2013/061728 dated Oct. 18, 2013, entitled "Surgical Training Model for Laparoscopic Procedures".
European Patent Office, The International Search Report and Written Opinion for International Application No. PCT/US2012/070971, dated Jul. 4, 2014, entitled "Advanced Surgical Simulation Constructions and Methods".
The International Bureau of WIPO, International Preliminary Report on Patentability for International Application No. PCT/US2012/070971, titled "Advanced Surgical Simulation" dated Jun. 24, 2014.
The International Bureau of WIPO, International Preliminary Report on Patentability for International Application No. PCT/US2012/060997, titled "Simulated Tissue Structure for Surgical Training" dated Apr. 22, 2014.
European Patent Office, International Search Report and Written Opinion for International Application No. PCT/US2013/053497 titled "Simulated Stapling and Energy Based Ligation for Surgical Training" dated Nov. 5, 2013.
The International Bureau of WIPO, International Preliminary Report on Patentability for International Application No. PCT/US2014/042998, titled "Gallbladder Model" dated Dec. 30, 2015.
The International Bureau of WIPO, International Preliminary Report on Patentability for International Application No. PCT/US2014/048027, titled "First Entry Model" dated Feb. 4, 2016.
European Patent Office, The International Search Report and Written Opinion of the International Searching Authority for International Application No. PCT/US2014/038195 titled "Hernia Model", dated Oct. 15, 2014.
European Patent Office, The International Search Report and Written Opinion of the International Searching Authority for International Application No. PCT/US2014/048027 titled "First Entry Model", dated Oct. 17, 2014.
European Patent Office, The International Search Report and Written Opinion for International Application No. PCT/US2014/042998, title; Gallbladder Model, dated Jan. 7, 2015.
The International Bureau of WIPO, International Preliminary Report on Patentability for international application No. PCT/US2013/061728, titled Surgical Training Model for Laparoscopic Procedures, dated Apr. 9, 2015.
The International Bureau of WIPO, International Preliminary Report on Patentability for International Application No. PCT/US2013/062363, titled Surgical Training Model for Laparoscopic Procedures, dated Apr. 9, 2015.

(56) References Cited

OTHER PUBLICATIONS

The International Bureau of WIPO, International Preliminary Report on Patentability for International Application No. PCT/US2013/062269, titled Surgical Training Model for Laparoscopic Procedures, dated Apr. 9, 2015.
The International Bureau of WIPO, International Preliminary Report on Patentability for International Application No. PCT/US2013/061557, titled Surgical Training Model for Laparoscopic Procedures, dated Apr. 9, 2015.
European Patent Office, The International Search Report and Written Opinion for International Application No. PCT/US2015/022774, dated Jun. 11, 2015 entitled "Simulated Dissectible Tissue."
Kurashima Y et al, "A tool for training and evaluation of Laparoscopic inguinal hernia repair; the Global Operative Assessment of Laparoscopic Skills-Groin Hernia" American Journal of Surgery, Paul Hoeber, New York, NY, US vol. 201, No. 1, Jan. 1, 2011, pp. 54-61 XP027558745.
The International Bureau of WIPO, International Preliminary Report on Patentability, for PCT application No. PCT/US2013/053497, titled, Simulated Stapling and Energy Based Ligation for Surgical Training, dated Feb. 12, 2015.
The International Bureau of WIPO, International Preliminary Report on Patentability for International Application No. PCT/US2013/061949, titled Surgical Training Model for Laparoscopic Procedures, dated Apr. 9, 2015.
The International Bureau of WIPO, International Preliminary Report on Patentability for International Application No. PCT/US2014/019840, titled Simulated Tissue Structure for Surgical Training, dated Sep. 11, 2015.
European Patent Office, The International Search Report and Written Opinion for International Application No. PCT/US2015/020574, titled "Advanced First Entry Model for Surgical Simulation," dated Jun. 1, 2015.
Anonymous: Silicone rubber-from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, titled Hernia Model, dated Nov. 26, 2015.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
Society of Laparoendoscopic Surgeons, "Future Technology Session: The Edge of Innovation in Surgery, Space, and Business" http://www.laparoscopytoday.com/endourology/page/2/, Figure 1B: http://laparoscopy.blogs.com/laparoscopy_today/images/6-1/6-1VlaovicPicB.jpg , Sep. 5-8, 2007, 10 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2015/059668 titled "Simulated Tissue Models and Methods" dated Apr. 26, 2016, 20 pgs.
Australian Patent Office, Patent Examination Report No. 1 for Australian Application No. 2012358851 titled "Advanced Surgical Simulation" dated May 26, 2016, 3 pgs.
European Patent Office, International Search Report and Written Opinion for International Application No. PCT/US2016/032292 titled "Synthetic Tissue Structures for Electrosurgical Training and Simulation," dated Jul. 14, 2016, 11 pgs.
European Patent Office, International Search Report and Written Opinion for International Application No. PCT/US2016/018697 titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.
European Patent Office, The International Search Report and Written Opinion of the International Searching Authority for International Application No. PCT/US2016/036664 titled "Hysterectomy Model", dated Aug. 19, 2016, 15 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf , printed Aug. 23, 2016, pp. 1-6.
3D-MED Corporation, "Loops and Wire #1" https://www.3-dmed.com/product/loops-and-wire-1 , printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.

* cited by examiner

SURGICAL TRAINING MODEL FOR LAPAROSCOPIC PROCEDURES

This application claims priority to and benefit of U.S. Provisional Patent Application Ser. No. 61/707,658 entitled "Surgical training model for laparoscopic procedures" filed on Sep. 28, 2012 which is incorporated herein by reference in its entirety.

FIELD

Field of the Invention

This application is generally related to surgical training tools, and in particular, to simulated tissue structures and models for teaching and practicing various surgical techniques and procedures related but not limited to laparoscopic, endoscopic and minimally invasive surgery.

Background of the Invention

Medical students as well as experienced doctors learning new surgical techniques must undergo extensive training before they are qualified to perform surgery on human patients. The training must teach proper techniques employing various medical devices for cutting, penetrating, clamping, grasping, stapling, cauterizing and suturing a variety of tissue types. The range of possibilities that a trainee encounters is great. For example, different organs and patient anatomies and diseases are presented. The thickness and consistency of the various tissue layers will also vary from one part of the body to the next and from one patient to another. Different procedures demand different skills. Furthermore, the trainee must practice techniques in various anatomical environs that are influenced by factors such as the size and condition of the patient, the adjacent anatomical landscape and the types of targeted tissues and whether they are readily accessible or relatively inaccessible.

Numerous teaching aids, trainers, simulators and model organs are available for one or more aspects of surgical training. However, there is a need for model organs or simulated tissue elements that are likely to be encountered and that can be used in practicing laparoscopic, minimally invasive surgical procedures. In laparoscopic surgery, a trocar or cannula is inserted to access a body cavity and to create a channel for the insertion of a camera such as a laparoscope. The camera provides a live video feed capturing images that are then displayed to the surgeon on one or more monitors. Another trocar/cannula is inserted to create a pathway through which surgical instruments are passed. The surgeon performs the procedure manipulating instruments placed through the keyholes while observing the target anatomy on the video display. The targeted tissue location such as the abdomen is typically enlarged by delivering carbon dioxide gas to insufflate the body cavity and create a working space large enough to accommodate the scope and instruments used by the surgeon. The insufflation pressure in the tissue cavity is maintained by using specialized trocars. Laparoscopic surgery offers a number of advantages when compared with an open procedure. These advantages include reduced pain, reduced blood and shorter recovery times.

Laparoscopic or endoscopic minimally invasive surgery requires an increased level of skill compared to open surgery because the target tissue is not directly observed by the clinician. The target tissue is observed on monitors displaying a portion of the surgical site that is accessed through a small opening. Therefore, clinicians need to practice visually determining tissue planes, three-dimensional depth perception on a two-dimensional viewing screen, hand-to-hand transfer of instruments, suturing, precision cutting and tissue and instrument manipulation. Typically, models simulating a particular anatomy or procedure are placed in a simulated pelvic trainer where the anatomical model is obscured from direct visualization by the practitioner. Ports in the trainer are employed for passing instruments to practice techniques on the anatomical model hidden from direct visualization. Simulated pelvic trainers provide a functional, inexpensive and practical means to train surgeons and residents the basic skills and typical techniques used in laparoscopic surgery such as grasping, manipulating, cutting, tying knots, suturing, stapling, cauterizing as well as how to perform specific surgical procedures that utilized these basic skills. Simulated pelvic trainers are also effective sales tools for demonstrating medical devices required to perform these laparoscopic procedures.

Therefore, it is desirable to present a model suitable for practicing certain surgical techniques described above. In particular, there is a need for a model that isolates particular steps or techniques of a procedure such as tying knots, grasping, manipulating and moving tissue in a simulated laparoscopic environment. The laparoscopic training model is removably placed inside a simulated laparoscopic environment such as a laparoscopic trainer in which it is at least partially obscured from direct visualization. A camera and monitor provide visualization of the target model to the practitioner. After a technique is practiced, it is furthermore desirable that such a model permits repeatable practice with ease, speed and cost savings. In view of the above, it is an object of this invention to provide a surgical training device that provides a platform for practicing surgical techniques that also enables repeatable practice. It has been demonstrated that the use of simulation trainers greatly enhances the skill levels of new laparoscopists and are a great tool to train future surgeons in a non-surgical setting. There is a need for such improved, realistic and effective surgical training models.

SUMMARY OF THE INVENTION

According to one aspect of the invention, a surgical training device for training and practicing laparoscopic procedures is provided. The device includes a laparoscopic trainer. The laparoscopic trainer includes a trainer base portion and a trainer top portion connected to and spaced apart from the trainer base portion to define a trainer internal cavity between the trainer top portion and the trainer base portion. At least one aperture or a penetrable tissue simulation region for accessing the trainer internal cavity is provided. A scope configured to capture live video of the cavity is included and a video monitor is connected to the scope and configured to display live video of the cavity. A practice model is removably disposed inside the trainer internal cavity such that the practice model is observable via the scope and video monitor yet obscured from direct visualization by at least the trainer top portion. The practice model includes a base having an upper surface substantially facing upwardly toward the trainer top cover when disposed inside the laparoscopic trainer. The base includes more than one practice station located on the upper surface of a base. Each practice station includes a cavity having an opening to the upper surface. The cavity extends from the upper surface into the base. A cover is connected to and movable with respect to the base in the location of the cavity. The cover is movable between a first position covering the opening to the cavity in the base and a second position uncovering the opening to the cavity in the base. A removable target object is disposed inside the cavity. The object is hidden from view beneath the cover when in the first position and the object is removable from the cavity when the cover is in the second position.

According to another aspect of the invention, a surgical training device is provided. The device includes a base having a top surface and a bottom surface. A plurality of practice stations is formed in the base facing the top surface. Each practice station includes a cavity formed in the base having an opening at the upper surface and extending into the base. A cover is connected to the base in the location of the cavity. The cover is movable with respect to the base between a first position covering the opening to the cavity and a second position uncovering the opening to the cavity. A removable target object is disposed inside the cavity. The object is hidden beneath the cover when in the first position and removable from the cavity when in the second position.

According to another aspect of the invention, a method for practicing laparoscopic procedures is provided. The method includes the step of providing a laparoscopic trainer. The laparoscopic trainer includes a trainer base portion and a trainer top portion connected to and spaced apart from the trainer base portion to define a trainer internal cavity between the trainer top portion and the trainer base portion. At least one aperture or a penetrable tissue simulation region for accessing the trainer internal cavity is provided. A scope configured to capture live video of the cavity is included and a video monitor is connected to the scope and configured to display live video of the cavity. A practice model is removably disposed inside the trainer internal cavity such that the practice model is observable via the scope and video monitor yet obscured from direct visualization by at least the trainer top portion. The practice model includes a base having an upper surface substantially facing upwardly toward the trainer top cover when disposed inside the laparoscopic trainer. The base includes more than one practice station located on the upper surface of a base. Each practice station includes a cavity having an opening to the upper surface. The cavity extends from the upper surface into the base. A cover is connected to and movable with respect to the base in the location of the cavity. The cover is movable between a first position covering the opening to the cavity in the base and a second position uncovering the opening to the cavity in the base. A removable target object is disposed inside the cavity. The object is hidden from view beneath the cover when in the first position and the object is removable from the cavity when the cover is in the second position. The method includes inserting at least one laparoscopic grasper through the at least one aperture or penetrable tissue simulation region into the trainer cavity. The cover of one practice station is grasped by the grasper and the cover is moved from a first position to a second position. The removable target object is removed from the cavity while the cover is in a second position. A laparoscopic grasper is used to maintain the cover in the first position while another laparoscopic grasper is inserted through the at least one aperture or penetrable tissue simulation region into the trainer cavity and into the cavity of a practice station having a cover in the second position. A removable target object located in the cavity of the practice station in the second position is grasped by the user employing a laparoscopic grasper and removed from the cavity of the practice station. The method further includes providing another practice station having a plurality of spaced apart pegs connected to the upper surface of the base and extending upwardly from the upper surface. Each peg is associated with a particular geometric shape or color and the removable target object includes an opening configured to be passed over at least one peg. The removable target object is associated with one of the geometric shapes or colors of at least one peg. The method includes the step of identifying the geometric shape or color of the removable target object and using a laparoscopic grasper to move the target object from a cavity of a practice station and passing the target object over a peg having a corresponding geometric shape or color. The method includes the step of providing another practice station in the base configured for practicing the tying and untying of knots using laparoscopic graspers. The practice station includes a first string attached at a proximal end to the upper surface of the base and a second string attached at a proximal end to the upper surface of the base adjacent to the first string. Each of the first and second strings has a free distal end. A removable target object is passed over one of the strings. The method includes the step of untying the knot and removing the target object from the string and placing the target object over one of the pegs. The method includes the step of identifying the geometric shape or color associated with the target object and moving it from the string onto a peg having an associated geometric shape or color that corresponds to the associated geometric shape or color of the target object. The method includes holding a flexible cover while removing a target object. The method also includes the step of penetrating a cover with a surgical instrument to access the cavity of a base station to remove a target object located inside the cavity.

DETAILED DESCRIPTION OF THE INVENTION

Figure 1:
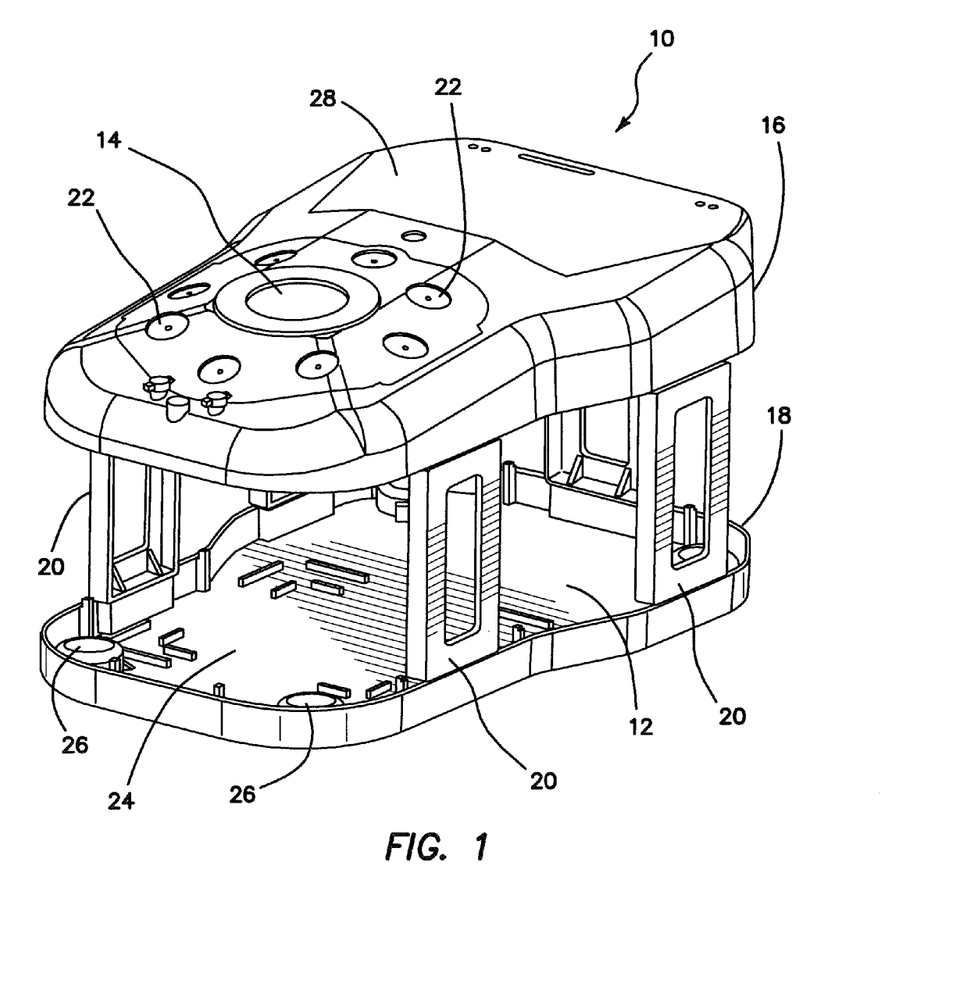
FIG. 1 illustrates a top perspective view of a surgical training device according to the present invention.

A surgical training device 10 that is configured to mimic the torso of a patient such as the abdominal region is shown in FIG. 1. The surgical training device 10 provides a body cavity 12 substantially obscured from the user and configured for receiving simulated or live tissue as well as model organs or a training model of the like described in this invention. The body cavity 12 is accessed via a tissue simulation region 14 that is penetrated by the user employing devices and instruments to practice surgical techniques on the tissue or organ model found located in the body cavity 12. Although the body cavity 12 is shown to be accessible through a tissue simulation region, a hand-assisted access device or single-site port device may be alternatively employed to access the body cavity 12. An exemplary surgical training device is described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

Still referencing FIG. 1, the surgical training device 10 includes a top cover 16 connected to and spaced apart from a base 18 by at least one leg 20. FIG. 1 shows a plurality of legs 20. The surgical training device 10 is configured to mimic the torso of a patient such as the abdominal region.

The top cover 16 is representative of the anterior surface of the patient and the space between the top cover 16 and the base 18 is representative of an interior of the patient or body cavity where organs reside. The surgical trainer 10 is a useful tool for teaching, practicing and demonstrating various surgical procedures and their related instruments in simulation of a patient undergoing a surgical procedure. Surgical instruments are inserted into the cavity 12 through the tissue simulation region 14 as well as through pre-established apertures 22 in the top cover 16 or from the side between the top cover 16 and the base 18. Various tools and techniques may be used to penetrate the top cover 16 to perform mock procedures on simulated organs or training models placed between the top cover 16 and the base 18. The base 18 includes a model-receiving area 24 or tray for staging or holding a training model. The model-receiving area 24 of the base 18 includes frame-like elements for holding the model (not shown) in place to keep it from sliding around while being manipulated by surgical instruments. To help retain the model on the base 18, a clip attached to a retractable wire is provided at locations 26. The retractable wire is extended and then clipped to hold the model in position substantially beneath the tissue simulation region 14. Other means for retaining the model include a patch of hook-and-loop type fastening material (VELCRO®) affixed to the base 18 in the model receiving area 24 such that it is removably connectable to a complementary piece of hook-and-loop type fastening material (VELCRO®) affixed to the model.

A video display monitor 28 that is hinged to the top cover 16 is shown in a closed orientation in FIG. 1. The video monitor 62 is connectable to a variety of visual systems for delivering an image to the monitor. For example, a scope inserted through one of the pre-established apertures 22 or a webcam located in the cavity 12 and used to observe the simulated procedure can be connected to the video monitor 28 and/or a mobile computing device to provide an image to the user. Also, audio recording or delivery means may also be provided and integrated with the trainer 10 to provide audio and visual capabilities. Means for connecting a portable memory storage device such as a flash drive, smart phone, digital audio or video player, or other digital mobile device is also provided to record training procedures and/or play back pre-recorded videos on the monitor for demonstration purposes. Of course, connection means for providing an audio visual output to a larger screen other than the monitor is provided. In another variation, the top cover 10 does not include a video display but includes means for supporting a laptop computer, a mobile digital device or tablet such as an IPAD® and connecting it by wire or wirelessly to the trainer.

When assembled, the top cover 16 is positioned directly above the base 18 with the legs 20 located substantially around the periphery and interconnected between the top cover 16 and base 18. The top cover 16 and base 18 are substantially the same shape and size and have substantially the same peripheral outline. Although the trainer 10 has no sidewalls, the legs 20 partially obscure the internal cavity from view from an otherwise open-sided trainer 10. In the variation shown in FIG. 1, the legs 20 include openings to allow ambient light to illuminate the internal cavity as much as possible and also to advantageously provide as much weight reduction as possible for convenient portability. The top cover 16 is removable from the legs 20 which in turn are removable or collapsible via hinges or the like with respect to the base 18. Therefore, the unassembled trainer 10 has a reduced height that makes for easier portability. In essence, the surgical trainer 10 provides a simulated body cavity 12 that is obscured from the user. The body cavity 12 is configured to receive at least one surgical model accessible via at least one tissue simulation region 14 and/or apertures 22 in the top cover 16 or the sides through which the user may access the models to practice laparoscopic or endoscopic minimally invasive surgical techniques.

Figure 2:
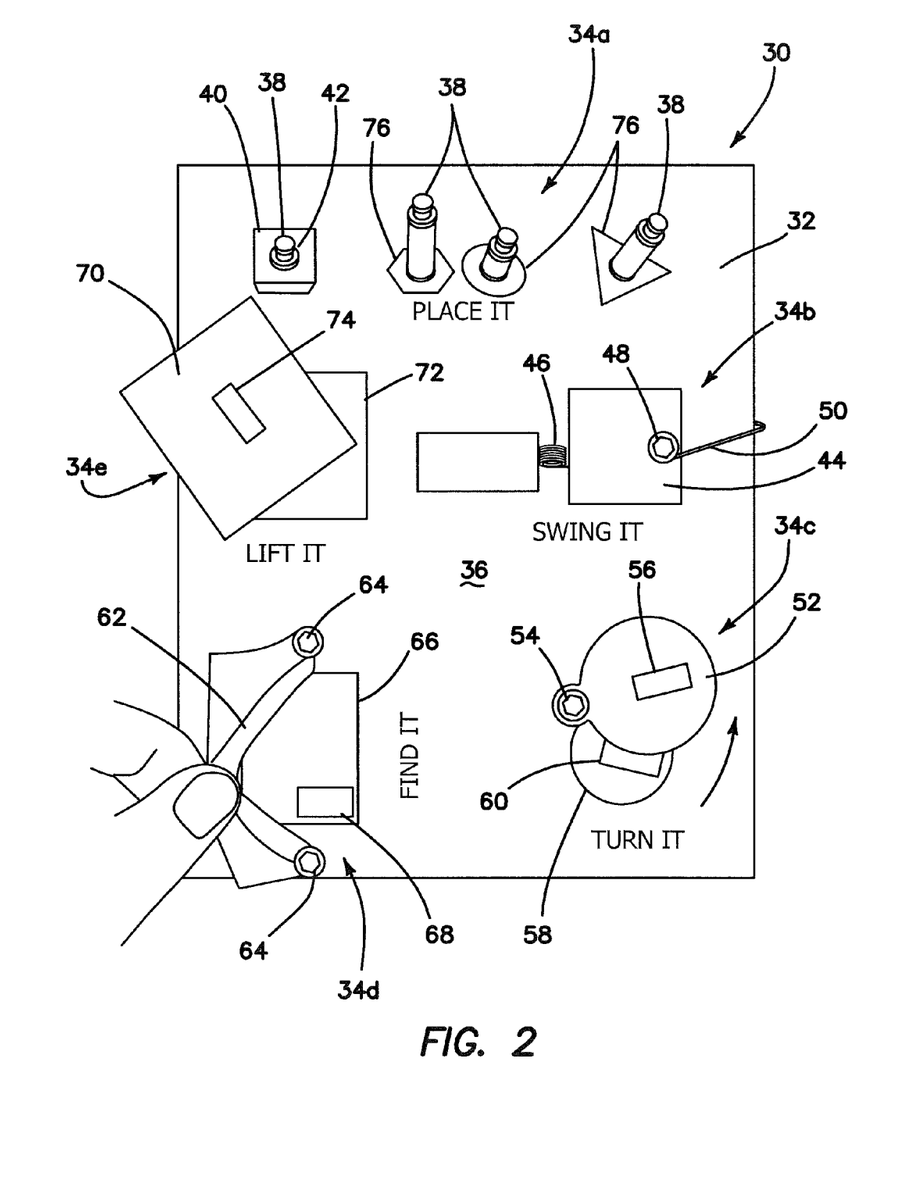
FIG. 2 illustrates a top view of a training model according to the present invention.

A model 30 for the practice of laparoscopic or open procedures and techniques according to the present invention is shown in FIG. 2. The model 30 is configured to be placed inside the surgical training device 10 described above or other similar surgical trainer. The model 30 includes a base 32, and a plurality of practice stations 34 connected to the upper surface 36 of the base 32. Five practice stations, 34a, 34b, 34c, 34d and 34e are shown in FIG. 2 and each is configured for practicing an individual surgical technique or exercise employing traditional laparoscopic instruments.

The base 32 is a platform that serves as a bottom support for the rest of the model 30 and it is sized and configured such that the model does not tip over. The platform is made of any suitable material such as metal or plastic. The base 32 is of sufficient heft to maintain the stability of the model 30 in the upright position while being manipulated by a user. The model 30 is sized and configured to be placed into the body cavity 12 of the surgical trainer 10 in the location of the model receiving area 24. The underside of the base 32 is provided with means to affix the model 30 inside the surgical trainer 10 so that the model 30 does not move while being manipulated. Such means to affix the model 30 inside the trainer 10 include but are not limited to adhesive, suction cup, snap-fit, magnet, and a hook-and-loop type fastener material attached to the bottom surface of the base 32 and configured to connect to a complementary hook-and-loop type fastener material or adhesive attached to the base 18 of the surgical trainer 30.

The first practice station 34a includes one or more pegs or posts 38 connected to the base 32 and extending upwardly from the upper surface 36 of the base 32. The pegs 38 are elongated and cylindrical in shape although the invention is not so limited and the pegs can be of any shape and size. The practice station 34a includes an object 40 having an aperture 42 sized and configured to fit over one of the pegs 38. Placing the object 40 may require orienting the object such that the aperture 42 of the object 40 aligns with the shape of peg 38. In one variation, pegs 38 having different cross-sectional shapes are provided together with objects having apertures 42 that correspond to the shape of the pegs 38. Complex polygonal pegs 38 and objects 40 with corresponding polygonal-shaped apertures 42, for example, would require the user to manipulate the object 40 such that the aperture can be passed over one of the correspondingly-shaped pegs 38. In this exercise, the user employs a surgical instrument such as a laparoscopic grasper inserted through an aperture 22, simulated tissue penetration region 14 or side of the trainer 10 to grab the object 40 lift it from one peg 38 and place it on and over another peg 38 such that the aperture 42 of the object 40 aligns with the peg 38 and fits onto the peg 38. In one variation, in the plurality of pegs 38, each peg 38 has a different height. The varying heights of the pegs 38 allow the user to practice depth perception while placing the object 40. In another training procedure, the pegs 38 may have the same cross-sectional shape as shown in FIG. 2 and the upper surface 36 of the base 32 is inscribed with various shapes 76. Objects 40, 60, 68 retrieved from any of the other practice stations, such as stations 34b, 34c, 34d, may be placed over the peg 38 having the inscribed shape beneath the peg 38 that corresponds to the shape of the retrieved object.

The second practice station 34b includes a cover 44. The cover 44 is a rigid door 44 that is connected to the base 32 via a hinge 46 and the door 44 may further include a knob 48 connected to the outer surface of the door 44. The hinge 46 may be spring loaded such that the door 44 is biased in the closed position. Underneath the door 44 is a cavity (not shown) that may include an object (not shown) that is hidden from view when the door 44 is closed. The cavity is formed in the base 32 and may be any shape or size and depth. The cavity opens to the upper surface 36 such that when the door 44 is moved, the cavity beneath the door 44 is uncovered. In this exercise, the user employs a surgical instrument such as a laparoscopic grasper inserted through an aperture 22, simulated tissue penetration region 14 or side of the trainer 10 to grab the knob 48 or door 44 to swing it open from a closed position. If a cavity is provided underneath the door 44, the user must maintain the door 44 in the open position while another instrument in another hand is used to grab an object located inside the cavity and remove it. In one variation, a string 50 is attached to the knob 48 or door 44 to allow the user to grab the string 50 instead of the knob 48 or door 44 to swing and hold the door 44 open. The object may be placed over a peg 38 at the first station 34a such that object is placed over the peg 38 having a shape 76 that corresponds with the shape associated with the object.

The third practice station 34c includes a cover 52 connected to the top surface of the base 32 with a connector 54 and the cover 52 may further include a knob 56 connected to the outer surface of the cover 52. The connector 54 is a fastener that permits the cover 44 to slide, swivel or pivot about the fastener along the upper surface 36 of the base 32 to uncover a cavity 58 underneath the cover 52 with an object 60 optionally located inside the cavity 58. The object 60 removed from the cavity 58 may then be placed over a peg 38 that corresponds to the shape of the object 60. The cavity 58 is formed in the base 32 and may be any shape or size and depth. A deeper cavity may increase the difficulty level of extracting the object 60. The cavity 58 may also be sinuous or have a portion hidden from view by a wall such that the user would have to reach around the obstruction with an instrument to see if an object 60 is hiding behind the wall inside the cavity 58. The cavity 58 opens to the upper surface 36 such that when the cover 52 is moved from a first position covering the cavity 58 to a second position uncovering the cavity 58, the opening to the cavity 58 as well as the object 60 disposed inside the cavity 58 is revealed to the user. In this exercise, the user uses a surgical instrument such as a laparoscopic grasper inserted through an aperture 22, simulated tissue penetration region 14 or side of the trainer 10 to grab the knob 56 or cover 52 to turn it or slide it from a first closed position to a second open position. If a cavity 58 is provided underneath the cover 52, the user can then reach inside the cavity 58 and grab the object 60 with the same grasper or another grasper held in an opposite hand of the user and remove the object 60 from the cavity 58 and place it to the side or remove it from the trainer 10. Alternatively, the object 60 may then be placed over a peg 38 at the first station 34a such that object 60 is placed over the peg 38 having a shape 76 that corresponds with the shape associated with the object 60.

The fourth practice station 34d includes a cover 62 connected to the base 32. The cover 62 is made of flexible material such as a sheet of silicone or fabric. The cover 62 may also be made of material configured to simulate tissue such as a silicone or other polymeric sheet that may include a mesh or fabric reinforcement. The cover 62 is connected to the base 32 such that a flap 62 is formed. The flap results from at least one edge or portion of the cover 62 being sufficiently free so as to be capable of being lifted or separated from the upper surface 36. The cover 62 of station 34d is shown connected to the base 32 with two fasteners 64 leaving at least one edge of material that is graspable and capable of being moved or stretched away from the upper surface 36 to expose a cavity 66 located underneath the flap 62. The fasteners 64 are screws or pins and any number may be employed to create a movable flap. In one variation, adhesive is used to connect at least a portion of the flap 62 to the upper surface 36 of the base 32. At least a portion of the flap 62 is attached to the base 32 such that at least a portion of the flap 62 can be moved upwardly or lifted to reveal a cavity 66 underneath the flap 62. The flap 62 can be elastic capable of being stretched as it is lifted or otherwise made to mimic real tissue. The cavity 66 is formed in the base 32 and may be any shape or size and depth. An object 68 is disposed inside the cavity 66. In this exercise, the user uses a surgical instrument such as a laparoscopic grasper inserted through an aperture 22, simulated tissue penetration region 14 or side of the trainer 10 to grab a free end of the flap 62 that is not affixed to the base 32, and then pull the free end of the flap 62 to uncover the cavity 66 and the object 68 therein while observing the model 30 on the video display 28 showing live images of the procedure within the body cavity 12. If a cavity 66 is provided underneath the flap 62, the user maintains the flap 62 in an open position uncovering the cavity 66 with a grasper in one hand and while using a second grasper in the opposite hand to retrieve the object 68 from the cavity 66. FIG. 2 shows a user employing his fingers to pull and hold the flap 62 open to uncover the object 68 inside the cavity 66 underneath the flap 62. Of course, the object 68 may then be placed over a peg 38 at the first station 34a such that object 68 is placed over the peg 38 having a shape 76 that corresponds with the shape associated with the object 68. In one variation of practice station 34d, the cover 62 is not provided with a flap or free edge for lifting away from the upper surface; but instead, the flexible cover 62 completely covers and seals the cavity 66. In such a variation, the cover 62 is made of penetrable material such as a sheet of silicone that can be pierced or cut open to create a flap to simulate surgical incision made into tissue to access the cavity 66.

The fifth practice station 34e includes a cover 70 in the form of a lid that is located above a cavity 72. The lid 70 may include a knob 74. The cover 70 is sized to completely cover and conceal the underlying cavity 72, can be any shape and may include protrusions on the undersurface of the lid 70 to help keep it in place above the cavity 72. In this exercise, the user employs a surgical instrument such as a laparoscopic grasper inserted through an aperture 22, simulated tissue penetration region 14 or side of the trainer 10 to grab the lid 70. The user may grab the lid 70 or the knob 74 connected to the lid 70. The user lifts the lid 70 from a first position to a second position uncovering the cavity 72 underneath and an object (not shown) located inside the cavity 72. The same grasper can be used to retrieve the object after placing the lid 72 aside or alternatively, the user may use another grasper inserted through an aperture 22, simulated tissue penetration region 14 or side of the trainer 10 and held in the opposite hand to retrieve and pull out the object found in the cavity 72. Of course, the object may then be placed over a peg 38 at the first station 34a such that object is placed over the peg 38 having a shape 76 that corresponds with the shape associated with the object.

In a sixth practice station that is not shown in FIG. 2, two strings are connected to the base 32. The strings are attached to the upper surface 36 of the base 32 such that their connection points to the upper surface 36 are spaced apart. Each string has a free distal end and length of string approximately 1-3 inches long measured from its attachment point to its free distal end. The strings may be interchangeable and are in the range of 3-10 inches long and have various thicknesses for varying the difficulty level. In this exercise, the user employs a surgical instrument such as a laparoscopic grasper in one hand inserted through an aperture 22, simulated tissue penetration region 14 or side of the trainer 10 to grab the free length of the first string and a second surgical instrument such as a laparoscopic grasper in the other hand inserted through an aperture 22, simulated tissue penetration region 14 or side of the trainer 10 to grab the free length of the second string. Holding both lengths of string, the user manipulates the two strings in a manner of tying a knot such as a suture knot. In a variation of this exercise, an object 40 having an aperture is placed over the string and a knot is pre-tied over the object 40. The user then practices untying the knot and removing the object 40. The object 40 may have a shape that corresponds to the shape underlying one of the pegs 38. The user then moves the object 40 over the peg 38 having the same shape as the object 40. Each string may have a different color in which the tying or untying of a knot is easier than if the both strings were the same color.

In the above-described practice stations, a cavity may or may not be formed underneath each movable object. Furthermore, each cavity may be different in size and shape and depth from the upper surface 36 allowing the user to practice depth perception in retrieving the objects. Each cavity may contain one or more objects with one of the objects being the target or desirable object to be retrieved. There may be cutting exercises inside the cavity required to be performed to free the object from the cavity requiring the user to switch instruments for example and use a surgical scalpel or other cutting instrument. The objects also may be color coded such that the user must retrieve all objects of the same color. Also, in one variation, the target object is not located inside each cavity requiring the user to search for the target object by lifting a number of movable objects before finding the target object inside a cavity. The user may proceed to collect a more than one target object. Also, any number of exercises may be included in one base 32 and the exercises may be performed in a particular sequence that increases in difficulty. For example, lifting the lid 70 of the fifth station 34e may be easier to perform than holding a trap door open while retrieving the object as required in the second station 34b. Also, various objects may be used and the objects can have any shape. For example, the objects can be spherical cylindrical, hoop-like, polymorphous and may include surface structures such as holes or protrusions that would allow the user increased facility for manipulation.

With the model 30 disposed inside the cavity 12 of a laparoscopic trainer 10, the manipulations are performed with the distal ends of surgical instruments extending into the cavity 12 through ports 22, apertures 14 and/or sides of the trainer 10. The proximal ends of the instruments are controlled by the hands of the user outside of the trainer 10. With the model 30 obscured from direct observation of the user, the user observes his/her manipulations of the model 30 on a video screen providing a live feed via a scope inserted into the cavity 12. This setup increases the difficulty in performing repeatable steps encountered in real surgery and advances the practitioner's laparoscopic surgical skills.

The model 30 is advantageously challenging and effective in that the user must use both hands equally and in tandem to complete several of the exercises of the practice stations. A stopwatch timer may be connected to the model so that the speed may be competitively recorded or evaluated for progress. Hence, the model 30 is particularly useful for the practice of a variety of laparoscopic techniques including determining and visualizing tissue planes, the practice of depth perception, hand-eye coordination, hand-to-hand transfer of instruments, use of both hands, switching instruments, tying knots and tissue manipulation. This model allows the clinician to keep their skills sharp or to "warm-up" beforehand for successful outcomes in real surgery.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:

1. A surgical training device, comprising:
    a practice model removably disposable inside a laparoscopic trainer internal cavity such that the practice model is observable via a scope and video monitor yet obscured from direct visualization; the practice model comprising:
        a base having an upper surface substantially facing upwardly toward a trainer top cover when disposed inside the laparoscopic trainer; the base having more than one practice station located on the upper surface of a base; each practice station comprising:
        a cavity having an opening to the upper surface; the cavity extending from the upper surface into the base;
        a cover connected to and movable with respect to the base in the location of the cavity; the cover movable between a first position covering the opening to the cavity in the base and a second position uncovering the opening to the cavity in the base; and
        a removable target object disposed inside the cavity of the one or more practice station; the object being hidden from view beneath the cover when in the first position; and the object being removable from the cavity when the cover is in the second position;
    wherein a first practice station includes a first cover that is hinged to the upper surface of the base;
    wherein a second practice stations includes a second cover that is connected to the base at the upper surface with a fastener such that the second cover is configured to slide along the upper surface of the base between the first position and the second position; and
    wherein a third cover of a third practice station is a flexible sheet of polymeric material at least partially connected to the upper surface of the base to form a flap that is movable with respect to the base to cover and uncover the third opening to the cavity of the base.

2. The surgical training device of claim 1 wherein the base includes another practice station having a plurality of spaced apart pegs connected to the upper surface of the base and extending upwardly from the upper surface; each peg being associated with a particular geometric shape; wherein the removable target object includes an opening configured to be passed over at least one peg; the removable target object being associated with one of the geometric shapes of at least one peg.

3. The surgical training device of claim 1 wherein the base includes another practice station configured for practicing the tying of knots; the practice station includes a first string attached at a proximal end to the upper surface of the base and a second string attached at a proximal end to the upper surface of the base adjacent to the first string; each of the first and second strings has a free distal end.

4. The surgical training device of claim 3 wherein a target object having an aperture is removably located on one of the first and second strings.

5. The surgical training device of claim 1 wherein the hinge is configured to bias the hinged cover toward the upper surface into a closed first position.

6. The surgical training device of claim 1 wherein the flexible sheet is connected to the base at two locations forming at least one free edge that is movable to uncover the opening to the cavity of the base.

7. The surgical training device of claim 1 wherein the cover of an additional practice station is a sheet of silicone connected to upper surface of the base around the periphery of the opening to the cavity such that the cavity is accessible by cutting the sheet.

8. The surgical training device of claim 1 wherein a cover of an additional practice station is a removable lid.

9. The surgical training device of claim 1 wherein the first cover has an upper surface and a knob or string connected to and protruding from the upper surface for moving the cover with respect to the base.

10. A surgical training device, comprising:
a base having a top surface and a bottom surface;
a plurality of practice stations formed in the base and facing the top surface; each practice station comprising:
a cavity formed in the base having an opening at the upper surface and extending into the base;
a cover connected to the base; the cover being movable with respect to the base between a first position covering the opening to the cavity and a second position uncovering the opening to the cavity; and
a removable target object disposed inside the cavity; the object being hidden beneath the cover when in the first position and removable from the cavity when in the second position;
wherein a first practice station includes a first cover that is hinged to the upper surface of the base;
wherein a second practice station includes a second cover that is connected to the base at the upper surface with a fastener such that the second cover is configured to slide along the upper surface of the base between the first position and the second position.

11. The surgical training device of claim 10 wherein the hinge is configured to bias the hinged cover toward the upper surface into a closed first position.

12. The surgical training device of claim 10 wherein the cover of an additional practice station is a flexible sheet of polymeric material at least partially connected to the upper surface of the base to form a flap that is movable with respect to the base to cover and uncover the opening to the cavity of the base.

13. The surgical training device of claim 12 wherein the cover of an additional practice station is connected to the base at two locations forming at least one free edge that is movable to uncover the opening to the cavity of the base.

14. The surgical training device of claim 10 wherein the base includes another practice station having a plurality of spaced apart pegs connected to the upper surface of the base and extending upwardly from the upper surface; each peg being associated with a particular geometric shape; wherein the removable target object includes an opening configured to be passed over at least one peg; the removable target object being associated with one of the geometric shapes of at least one peg.

15. The surgical training device of claim 1 further including a laparoscopic trainer comprising:
a trainer base portion;
a trainer top portion connected to and spaced apart from the trainer base portion to define a trainer internal cavity between the trainer top portion and the trainer base portion;
at least one aperture or a penetrable tissue simulation region for accessing the trainer internal cavity; and
a scope configured to capture live video of the cavity;
a video monitor connected to the scope and configured to display the live video of the cavity.

* * * * *